(12) United States Patent
Weston et al.

(10) Patent No.: US 12,090,917 B2
(45) Date of Patent: Sep. 17, 2024

(54) VEHICLE ENTRY POWER SAVING

(71) Applicant: Ford Global Technologies, LLC, Dearborn, MI (US)

(72) Inventors: Keith Weston, Canton, MI (US); Brendan Francis Diamond, Grosse Pointe, MI (US); Jonathan Hair, Northville, MI (US); Michael Alan McNees, Flat Rock, MI (US); Stuart C. Salter, White Lake, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 38 days.

(21) Appl. No.: 18/061,519

(22) Filed: Dec. 5, 2022

(65) Prior Publication Data

US 2024/0181959 A1 Jun. 6, 2024

(51) Int. Cl.
*B60Q 1/32* (2006.01)
*G07C 9/00* (2020.01)

(52) U.S. Cl.
CPC ........... *B60Q 1/32* (2013.01); *G07C 9/00309* (2013.01); *G07C 2009/00507* (2013.01)

(58) Field of Classification Search
CPC .......................................... G07C 2009/00507
See application file for complete search history.

(56) References Cited

U.S. PATENT DOCUMENTS

| | | | |
|---|---|---|---|
| 10,244,476 B2 | 3/2019 | Elangovan et al. | |
| 10,569,739 B2 | 2/2020 | Pudar et al. | |
| 10,919,490 B1 | 2/2021 | Akhoirshida et al. | |
| 2015/0120151 A1 | 4/2015 | Akay et al. | |
| 2018/0096545 A1 | 4/2018 | Spahl et al. | |
| 2018/0186244 A1* | 7/2018 | Harvey | H02J 7/0031 |
| 2020/0349781 A1* | 11/2020 | Warrier | G07C 9/00309 |
| 2021/0096629 A1* | 4/2021 | Thivierge, Jr. | H04W 4/80 |
| 2022/0147580 A1 | 5/2022 | Ricci | |

* cited by examiner

*Primary Examiner* — Thomas S McCormack
(74) *Attorney, Agent, or Firm* — Frank Lollo; Bejin Bieneman PLC

(57) ABSTRACT

A system for power reduction during vehicle access. A memory storing instructions executable by a processor includes instructions to receive an access message by a target vehicle, authenticate the access message, and determine either an occurrence of a power-saving condition or a non-occurrence of the power-saving condition. The instructions include activating a greeting indicator upon authentication of the access message and determining the non-occurrence of the power-saving condition, and determining not to activate the greeting indicator upon authentication of the access message and determining the occurrence of the power-saving condition.

20 Claims, 5 Drawing Sheets

VEHICLE ENTRY POWER SAVING

BACKGROUND

Some vehicles have doors, windows and/or lights that can be activated using a portable access device, such as a key fob or a smartphone. In some instances, when a portable access device is close to the vehicle, the portable device may allow the user to perform actions such as locking or unlocking vehicle doors and rolling up or down vehicle windows.

DETAILED DESCRIPTION

Figure 1:
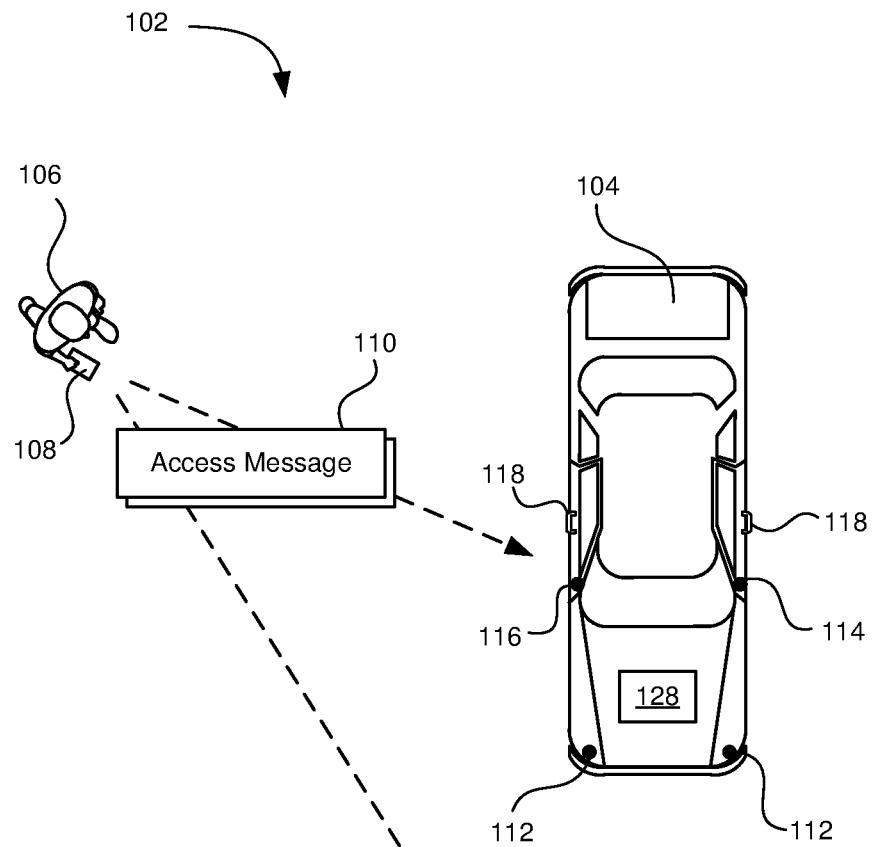
FIG. 1 shows an example system for power reduction during vehicle access.
Figure 1:
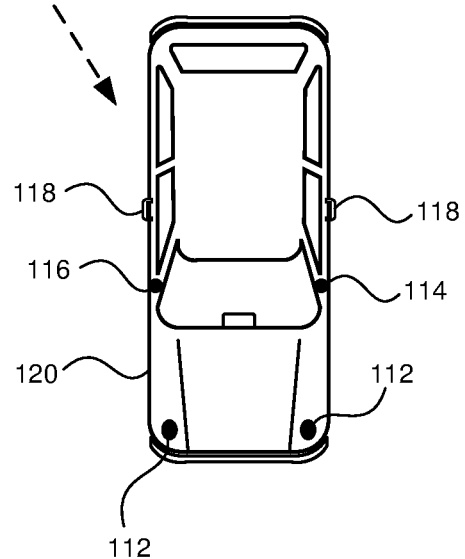

The present disclosure describes systems and methods for power reduction during vehicle access. A vehicle disclosed herein can be equipped with exterior "welcome lighting" or other indicators that the vehicle is ready for use, such as a projected image on a window or windshield, sounds or audio, unlocking doors, or suspension adjustments, that are activated when a vehicle operator with an access device, such as a key fob or a smartphone, approaches the vehicle. However, activating vehicle lights or other electrical loads when the vehicle operator has no plans to use the vehicle can prematurely reduce the vehicle battery's charge. Accordingly, disclosed herein are, for example, methods and system to predictively determine a likelihood of vehicle usage and selectively activate exterior lights or other electrical loads based on such a determination to prevent putting additional electrical load on the vehicle's electric battery.

Throughout the description reference is made to FIGS. 1-5. When referring to the Figures, like structures and elements shown throughout are indicated with like reference numerals.

In one exemplary configuration, a system for power reduction during vehicle access includes a processor and a memory. The memory stores instructions executable by the processor, including instructions to receive an access message by a target vehicle and to authenticate the access message. The instructions further include determining either an occurrence of a power-saving condition or a non-occurrence of the power-saving condition. Upon authentication of the access message and determining the non-occurrence of the power-saving condition, the instructions include activating a greeting indicator of the target vehicle. Upon authentication of the access message and determining the occurrence of the power-saving condition, the instructions include determining not to activate the greeting indicator.

In one configuration, the instructions include instructions to associate a vehicle operator with the access message and to receive a calendar schedule of the vehicle operator. Furthermore, the power-saving condition is based on, at least in part, the calendar schedule of the vehicle operator. In another configuration, the power-saving condition is based on, at least in part, historical usage data of the target vehicle by the vehicle operator.

In one configuration, the instructions include instructions to determine whether a second vehicle is located next to the target vehicle and to determine whether the vehicle operator historically operates the second vehicle more frequently than the target vehicle. The power-saving condition can be based on, at least in part, whether the vehicle operator historically operates the second vehicle more frequently than the target vehicle. The system implementation may include instructions to determine whether the target vehicle is physically blocking the second vehicle. The power-saving condition may be based on, at least in part, whether the target vehicle is physically blocking the second vehicle.

In one configuration, the instructions include instructions to determine current driving conditions and to determine whether the target vehicle is better equipped for the current driving conditions than the second vehicle. The power-saving condition may be based on, at least in part, whether the target vehicle is better equipped for the current driving conditions than the second vehicle.

The system may include instructions to receive a door handle activation signal from a door handle sensor. The power-saving condition may be based on, at least in part, whether the door handle activation signal has been received. The system may include instructions to determine whether the target vehicle has been inactive for a threshold time period. The power-saving condition may be based on, at least in part, whether the target vehicle has been inactive for a threshold time period.

In one configuration, the instructions include instructions to determine ambient lighting conditions outside the target vehicle. The power-saving condition may be based on, at least in part, the ambient light conditions outside the target vehicle.

In another implementation, the access message may include an indication of the occurrence of the power-saving condition. In one configuration, the instructions include instructions to train a machine learning model to determine the occurrence of the power-saving condition and the non-occurrence of the power-saving condition.

Another implementation contemplated is a system comprising a portable device. The portable device includes a processor and a memory storing instructions executable by the processor. The instructions include determining an occurrence or a non-occurrence of a power-saving condition for a target vehicle. The instructions further include transmitting, by the portable device, an access message containing an indication of the occurrence of the power-saving condition.

In one configuration, the instructions include instructions to determine a vehicle operator of the target vehicle and determine a calendar schedule of the vehicle operator. Furthermore, the power-saving condition may be based on, at least in part, the calendar schedule of the vehicle operator. In another configuration, the power-saving condition is based on, at least in part, historical usage data of the target vehicle by the vehicle operator.

In one configuration, the instructions include instructions to determine whether a second vehicle is located next to the target vehicle and to determine whether the vehicle operator historically operates the second vehicle more frequently than the target vehicle. The power-saving condition can be based on, at least in part, whether the vehicle operator historically operates the second vehicle more frequently than the target vehicle. The system implementation may include instructions to determine whether the target vehicle is physically blocking the second vehicle. The power-saving condition may be based on, at least in part, whether the target vehicle is physically blocking the second vehicle.

In one configuration, the instructions include instructions to determine current driving conditions and to determine whether the target vehicle is better equipped for the current driving conditions than the second vehicle. The power-saving condition may be based on, at least in part, whether the target vehicle is better equipped for the current driving conditions than the second vehicle.

The system may include instructions to determine whether the target vehicle has been inactive for a threshold time period and the power-saving condition may be based on, at least in part, whether the target vehicle has been inactive for a threshold time period. In one configuration, the instructions include instructions to determine ambient lighting conditions outside the target vehicle. The power-saving condition may be based on, at least in part, the ambient light conditions outside the target vehicle. In one configuration, the instructions include instructions to train a machine learning model to determine the occurrence of the power-saving condition and the non-occurrence of the power-saving condition.

Another exemplary configuration is a method for power reduction during vehicle access. The method includes the operations of receiving an access message by a target vehicle, authenticating the access message, determining either an occurrence of a power-saving condition or a non-occurrence of the power-saving condition. Upon authentication of the access message and determining the non-occurrence of the power-saving condition, the method includes activating exterior lighting of the target vehicle. Upon authentication of the access message and determining the occurrence of the power-saving condition, the method includes determining not to activate the exterior lighting.

Another implementation may include a computer program product for power reduction during vehicle access. A non-transitory computer readable storage medium includes computer readable program code configured to receive an access message by a target vehicle, authenticate the access message, determine one of an occurrence of a power-saving condition and a non-occurrence of the power-saving condition, activate exterior lighting of the target vehicle upon authentication of the access message and determining the non-occurrence of the power-saving condition, and determine not to activate the exterior lighting upon authentication of the access message and determining the occurrence of the power-saving condition.

FIG. 1 shows an example system 102 for power reduction during vehicle access. The system includes a target vehicle 104 and vehicle operator 106. The target vehicle 104 may be any passenger or commercial automobile such as a car, a truck, a sport utility vehicle, a crossover, a van, a minivan, a taxi, a bus, etc. The target vehicle may comprise exterior lights 112, including driver-side lights 114 and passenger-side lights 116. The target vehicle 104 may include door handles 118 to open vehicle doors and door handle sensors to detect door handle pulls. The target vehicle 104 may contain an electric battery 128 to power the vehicle's electrical components.

The vehicle operator 106 may carry a portable device 108 to gain access to the target vehicle 104. The portable device 108 may be a handheld device, such as a key fob, a key remote, etc. The portable device 108 may be a computing device, such as a smartphone, a personal digital device (PDA), or a tablet, and may include a processor and a memory. A portable device 108, as used herein, means any suitable portable electronic device including a transceiver that can communicate with a vehicle computer, typically within a relatively short range and a high frequency band.

The portable device 108 can be used to unlock the target vehicle 104 by wirelessly transmitting an access message 110. As used herein, an access message 110 is any communications to gain access to a vehicle, such as to unlock the vehicle's door(s) and/or to operate the vehicle. The access message 110 may include a cryptographic code that is authenticated by the vehicle. Authentication is the process of determining that the access message 110 corresponds to a particular vehicle by, for example, decrypting a cryptographic code, matching a public cryptographic key with a private cryptographic key, etc.

The access message 110 may be transmitted using a short-range transmitter at the portable device 108, such as an RFID transmitter, a Bluetooth® transmitter, etc. Other message transmission technologies, such as cellular radio transmission, IEEE 802 transmission, etc., may be used to transmit the access message 110. Bluetooth® is a registered trademark of the Bluetooth Special Interest Group headquartered in Kirkland, Washington, USA.

In one configuration, the vehicle operator 106 may carry multiple portable devices 108 with each portable device configured to transmit an access message 110 for a different vehicle. For example, the vehicle operator 106 may carry multiple key fobs. One key fob may send an access message 110 encoded to access the target vehicle 104 and a second key fob may send an access message 110 encoded to access a second vehicle 120.

In another example, the portable device 108 may be configured to transmit access messages 110 directed to multiple vehicles. For instance, the portable device 108 may be a smartphone acting as a phone as a key (PaaK) that can broadcast different access messages 110 encoded to access the target vehicle 104 and the second vehicle 120. In other arrangements of the system 102, the vehicle operator 106 may carry a combination of a key fob(s) and a PaaK(s).

As discussed in more detail below, the target vehicle 104 and/or the second vehicle 120, upon receiving the access message 110 and verifying credentials encoded therein, may determine an occurrence of a power-saving condition or a non-occurrence of the power-saving condition. A power-saving condition is defined herein as any condition where a vehicle should remain in a low-power consumption mode, also referred to as a standby mode, in response to receipt and authentication of the access message 110. When a power-saving condition exists, there is a likelihood that the vehicle operator 106 is not going to use the target vehicle 104 despite the target vehicle 104 receiving an access message 110. Determination of an occurrence of a power-saving condition may be rule-based, machine-learning based, or a combination of both.

A low-power consumption mode may include a state where a greeting indicator is not activated. As used herein, a greeting indicator is defined as a visual and/or auditory indicator that the vehicle 102 is ready for use. A greeting indicator may include, for example, exterior and/or interior lighting, such as puddle lamps, cabin lights, a projected image on a window or windshield. A greeting indicator can include sounds, such as a welcome message and/or a beep. A greeting indicator may further include, for example, door locks, deployment of running boards, and/or suspension adjustments (air suspension lowering the vehicle height for easier ingress). Thus, during a low-power consumption mode exterior lights 112 are not activated, the vehicle doors are not unlocked, interior lights are not activated, a human-machine interface (HMI) model is not activated, etc. If there is a non-occurrence of the power-saving condition, the vehicle may turn on its exterior lights 112 to welcome the vehicle operator 106 and/or alert the vehicle operator 106 that vehicle access is granted upon receipt and authentication of the access message 110.

Figure 2:
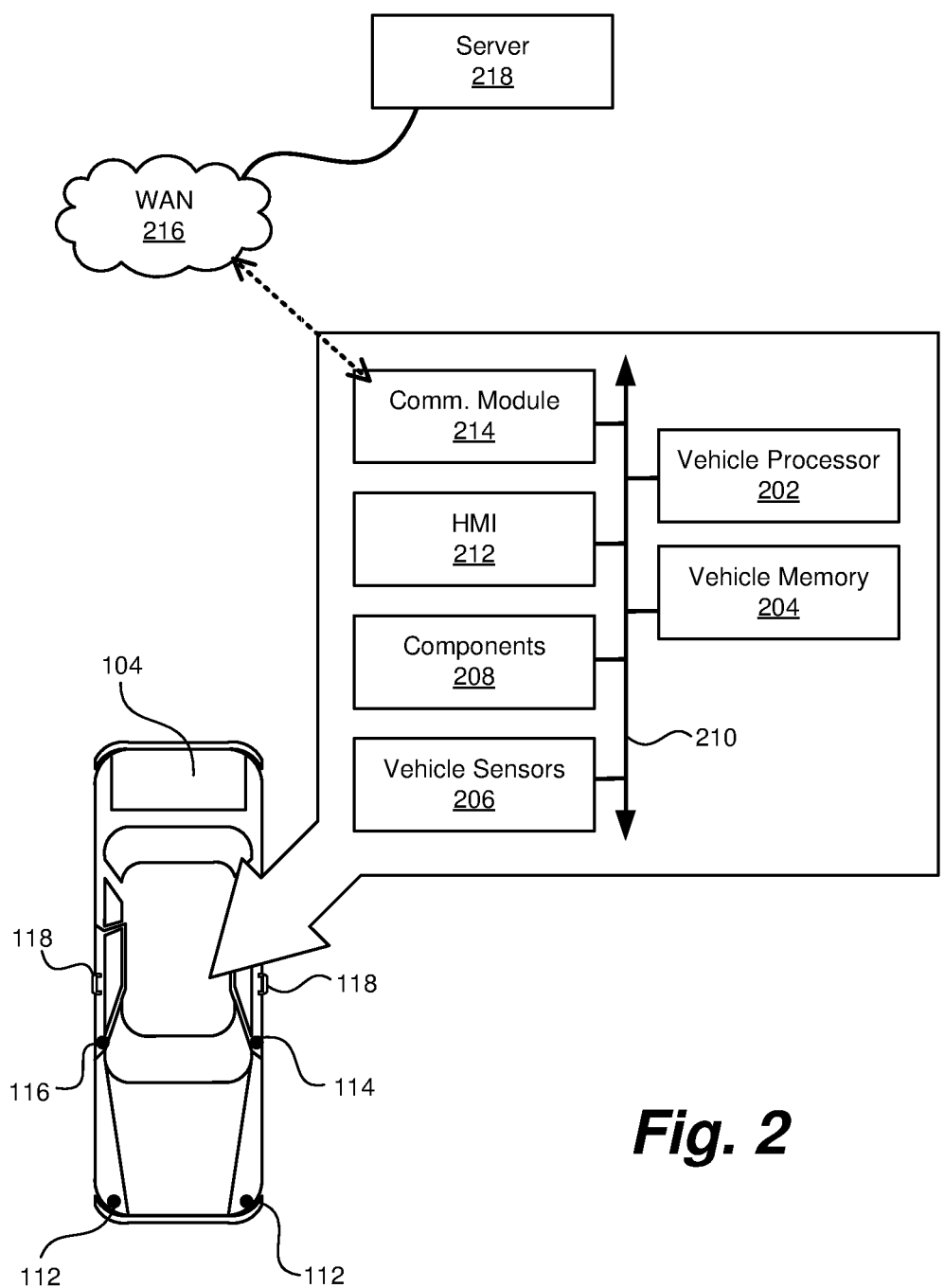
FIG. 2 shows an example target vehicle supporting power reduction during vehicle access.

FIG. 2 shows an example target vehicle 104 supporting, at least in part, power reduction during vehicle access. The target vehicle 104 includes a vehicle processor 202 and a vehicle memory 204.

The vehicle memory 204 includes one or more forms of computer readable media, and stores instructions executable by the vehicle processor 202 for performing various operations, including those disclosed herein. For example, a vehicle processor 202 can be a generic computer with a processor and memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing data generated by vehicle sensors 206 and/or communicating the sensor data.

The vehicle processor 202 may include an FPGA (Field-Programmable Gate Array), which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components 208 inside an FPGA may be configured based on VHDL programming, e.g. stored in a memory electrically connected to the FPGA circuit. In some examples, a combination of processor(s), ASIC(s), and/or FPGA circuits may be included in a vehicle processor 202.

The vehicle memory 204 can be of any type, e.g., hard disk drives, solid state drives, or any volatile or non-volatile media. The memory can store the collected data sent from the vehicle sensors 206. The vehicle memory 204 can be a separate device from the vehicle processor 202, and the vehicle processor 202 can retrieve information stored by the vehicle memory 204 via a vehicle network 210 in the target vehicle 104, e.g., over a CAN bus, a wireless network, etc. Alternatively or additionally, the vehicle memory 204 can be part of the vehicle processor 202. e.g., as a memory of the vehicle processor 202.

The vehicle processor 202 may include programming to operate one or more of vehicle 102 brakes, propulsion, e.g., control of acceleration in the vehicle 102 by controlling one or more of an internal combustion engine, electric motor, hybrid engine, steering, climate control, interior and/or exterior lights 112, etc., as well as to determine whether and when the vehicle processor 202, as opposed to a human operator, is to control such operations.

Additionally, the vehicle processor 202 may be programmed to determine whether and when a human operator is to control such operations. The vehicle processor 202 may include or be communicatively coupled to, e.g., via the vehicle network 210 such as a communications bus as described further below, more than one processor, e.g., included in components 208 such as vehicle sensors 206, electronic control units (ECUs) or the like included in the target vehicle 104 for monitoring and/or controlling various vehicle components, e.g., a powertrain controller, a brake controller, a steering controller, etc.

The vehicle processor 202 is generally arranged for communications on a vehicle network 210 that can include a communications bus in the target vehicle 104 such as a controller area network CAN or the like, and/or other wired and/or wireless mechanisms. The vehicle network 210 is a communications network via which messages can be exchanged between various devices, e.g., vehicle sensors 206, components 208, vehicle processor(s) 202, etc. in the target vehicle 104. The vehicle processor 202 can be generally programmed to send and/or receive, via vehicle network 210, messages to and/or from other devices in the target vehicle 104, e.g., any or all of ECUs, vehicle sensors 206, actuators, components 208, communications module, a human machine interface (HMI), etc. For example, various component subsystems (e.g., components 208 that can be controlled by respective ECUs) and/or vehicle sensors 206 may provide data to the vehicle processor 202 via the vehicle network 210. Further, in cases in which vehicle processor 202 comprises a plurality of devices, the vehicle network 210 may be used for communications between devices represented as a vehicle processor 202 in this disclosure. For example, vehicle network 210 can include a controller area network CAN in which messages are conveyed via a CAN bus, or a local interconnect network (LIN) in which messages are conveyed via a LIN bus.

In some implementations, the vehicle network 210 can include a network in which messages are conveyed using other wired communication technologies and/or wireless communication technologies e.g., Ethernet, WiFi, Bluetooth®, ultra-wide bandwidth (UWB) etc. Additional examples of protocols that may be used for communications over vehicle network 210 in some implementations include, without limitation, Media Oriented System Transport MOST, Time-Triggered Protocol (TTP), and FlexRay. In some implementations, the vehicle network 210 can represent a combination of multiple networks, possibly of different types, that support communications among devices in the target vehicle 104. For example, vehicle network 210 can include a CAN in which some devices in vehicle 102 communicate via a CAN bus, and a wired or wireless local area network in which some device in the target vehicle 104 communicate according to Ethernet or Wi-Fi communication protocols.

The target vehicle 104 typically includes a variety of vehicle sensors 206. A vehicle sensor 206 is a device that can obtain one or more measurements of one or more physical phenomena. Some vehicle sensors 206 can detect internal states of the target vehicle 104, for example, wheel speed, wheel orientation, and engine and transmission variables. The target vehicle 104 may include door handle sensors to detect door handle 118 pulls. The door handle sensors may be, for example, limit switches, reed switches, etc.

Some vehicle sensors 206 detect the position or orientation of the target vehicle 104, for example, global positioning system (GPS) sensors, accelerometers such as piezoelectric or microelectromechanical systems (MEMS), gyroscopes such as rate, ring laser, or fiber-optic gyroscopes; inertial measurements units (IMUs), and magnetometers. Some vehicle sensors 206 detect the external world, for example, radar sensors, scanning laser range finders, light detection and ranging (LIDAR) devices, and image processing sensors 108 such as cameras. A LIDAR device detects distances to objects by emitting laser pulses and measuring the time of flight for the pulse to travel to the object and back. Some vehicle sensors 206 are communications devices, for example, vehicle-to-infrastructure (V2I) or vehicle-to-vehicle (V2V) devices. Often, but not necessarily, a vehicle sensor 206 includes a digital-to-analog converter to converted sensed analog data to a digital signal that can be provided to a vehicle processor 202, e.g., via a network.

Vehicle sensors 206 can include a variety of devices, and can be disposed to sense and environment, provide data about a machine, etc., in a variety of ways. For example, a sensor could be mounted to a stationary infrastructure element on, over, or near a road. Moreover, various controllers in the target vehicle 104 may operate as vehicle sensors 206 to provide data via the vehicle network 210 or bus, e.g., data relating to the target vehicle 104 speed, acceleration, location, subsystem and/or component status, etc. Further, other vehicle sensors 206, in or on the target vehicle 104, stationary infrastructure element, etc., infrastructure could include cameras, short range radar, long range radar, LIDAR, and/or ultrasonic transducers, weight sensors, accelerometers, motion detectors, etc., can provide a variety of data. To provide just a few non-limiting examples, sensor data could include data for determining a position of a component 208, a location of an object, a speed of an object, a type of an object, a slope of a roadway, a temperature, a presence or amount of moisture, a fuel level, a data rate, etc.

The vehicle processor 202 may include programming to command one or more actuators to operate one or more vehicle subsystems or components 208, such as vehicle brakes, propulsion, or steering. That is, the vehicle processor 202 may actuate control of acceleration in the target vehicle 104 by controlling one or more of an internal combustion engine, electric motor, hybrid engine, etc., and/or may actuate control of brakes, steering, climate control, interior and/or exterior lights 112, etc. The vehicle processor 202 may include or be communicatively coupled to, e.g., via a vehicle network 210, more than one processor, e.g., included in components 208 such as vehicle sensors 206, electronic control units (ECUs) or the like for monitoring and/or controlling various vehicle components, e.g., ECUs or the like such as a powertrain controller, a brake controller, a steering controller, etc.

The target vehicle 104 can include an HMI 212 (human-machine interface), e.g., one or more of a display, a touchscreen display, a microphone, a speaker, etc. The user can provide input to devices such as the vehicle processor 202 via the HMI 212. The HMI 212 can communicate with the vehicle processor 202 via the vehicle network 210, e.g., the HMI 212 can send a message including the user input provided via a touchscreen, microphone, a camera that captures a gesture, etc., to the vehicle processor 202, and/or can display output, e.g., via a screen, speaker, etc.

The vehicle processor 202 may be configured for communicating via a communication module 214 or interface with devices outside of the target vehicle 104, e.g., through a wide area network (WAN) 216 and/or a vehicle-to-vehicle (V2V) network, vehicle-to-infrastructure or everything (V2X) or vehicle-to-everything including cellular vehicle-to-vehicle (C-V2X) communications, wireless cellular communications, DSRC, etc., to another vehicle, to an infrastructure element typically via direct radio frequency communications and/or typically via the network a remote server 218. The communication module 214 could include one or more mechanisms by which the vehicle processors 202 of different vehicles may communicate, including any desired combination of wireless e.g., cellular, wireless, satellite, microwave and radio frequency communication mechanisms and any desired network topology or topologies when a plurality of communication mechanisms are utilized. Exemplary communications provided via the module can include cellular, Bluetooth®, IEEE 802.11 protocol, dedicated short range communications (DSRC), cellular V2X (CV2X), and the like.

A vehicle processor 202 can be programmed to communicate with one or more remote sites such as a remote server 218, via a wide area network 216. The wide area network 216 can include one or more mechanisms by which a vehicle processor 202 may communicate with, for example, a remote server 218. Accordingly, the network can include one or more of various wired or wireless communication mechanisms, including any desired combination of wired e.g., cable and fiber and/or wireless e.g., cellular, wireless, satellite, microwave, and radio frequency communication mechanisms and any desired network topology or topologies when multiple communication mechanisms are utilized. Exemplary communication networks include wireless communication networks e.g., using Bluetooth®, Bluetooth® Low Energy BLE, IEEE 802.11. V2V, V2X, CV2X, Dedicated Short Range Communications DSRC, etc., local area networks and/or wide area networks 216, including the Internet, providing data communication services.

The remote server 218 may include one or more computing devices, e.g., having respective processors and memories and/or associated data stores, that are accessible via the wide area network 216.

As mentioned above, the vehicle memory 204 can store instructions executable by the vehicle processor 202. Returning to FIG. 1, these instructions include instructions to receive an access message 110 by a target vehicle 104. The access message 110 may include an encrypted code or other identifier designed to authenticate the vehicle operator 106 and allow access to the target vehicle.

The instructions may also instruct the processor 122 to authenticate the access message 110. Access message authentication may include decrypting an encrypted code within the access message 110. In one configuration, authentication may include comparing a public key within the access message 110 to a private key.

The vehicle memory 204 may include instructions to cause the vehicle processor 202 to determine an occurrence of a power-saving condition or a non-occurrence of the power-saving condition. As discussed above, a power-saving condition is any condition that, upon its occurrence, indicates that a vehicle's battery power can be conserved by not activating one or more electrical loads while the vehicle is "off" in response to receipt and authentication of the access message 110. Determination of an occurrence of a power-saving condition may be rule-based, machine-learning based, or a combination of both. For example, the vehicle processor 202 may utilize a machine learning model to automatically determine an occurrence of a power-saving condition.

A machine learning model can provide machine learning including prediction, filtering, machine learning processes, machine learning functions, or a combination thereof. For example, a suitable machine learning (ML) program such as a deep neural network (DNN) may be trained and then used to output, filter and/or predict an occurrence of a power-saving condition. A DNN can be a software program that can be loaded in memory and executed by a processor included in a computer, such as a vehicle processor, and/or a processor of the portable device 108, for example. In an example implementation, the DNN can include, but is not limited to, a convolutional neural network CNN, R-CNN Region-based CNN, Fast R-CNN, and Faster R-CNN. The DNN includes multiple nodes or neurons. The neurons are arranged so that the DNN includes an input layer, one or more hidden layers, and an output layer. The input and output layers may also include more than one node.

As one example, the DNN can be trained with ground truth data, i.e., data about a real-world condition or state. For example, the DNN can be trained with ground truth data and/or updated with additional data. Weights can be initialized by using a Gaussian distribution, for example, and a bias for each node can be set to zero. Training the DNN can include updating weights and biases via suitable techniques such as back-propagation with optimizations. Ground truth data means data deemed to represent a real-world environment, e.g., conditions and/or objects in the environment. Thus, ground truth data can include sensor data depicting an environment, e.g., a time of day, location, weather conditions, etc., along with a label or labels describing the environment, e.g., a label describing the data, e.g., calendar event, receipt of a prior access message, etc.

In the present context, ground truth data used to train a DNN could include, for example, determining conditions for the occurrence and non-occurrence of a power-saving condition. Then, the DNN could be included in the target vehicle 104 and/or a portable device 108 to output an indication of an occurrence of a power-saving condition. The vehicle memory 204 may include instructions to train a machine learning model to determine the occurrence of the power-saving condition or the non-occurrence of the power-saving condition.

In one configuration, the occurrence of a power-saving condition may be determined based on the vehicle operator's historical usage data of the target vehicle 104. For example, it may be that the vehicle operator 106 uses the second vehicle 118 to commute to work and does not normally drive the target vehicle 104 on weekday mornings. In this case, the vehicle memory 204 may include instructions to associate the vehicle operator 106 with the access message 110 and the power-saving condition may be based on, at least in part, historical usage data of the target vehicle 104 by the vehicle operator 106. In one configuration, the vehicle 104 may include instructions to identify an approaching person via, for example, facial recognition using sensors such as exterior cameras. Identification of an approaching vehicle operator 106 can be used as an authorization method to enter the vehicle 104 and/or for determining the existence of a power-saving condition.

In a similar configuration, the occurrence of a power-saving condition may be determined based on which of two or more vehicles the vehicle operator 106 uses more frequently. The instructions can include instructions to determine whether the second vehicle 120 is located next to the target vehicle 104 and to determine whether the vehicle operator 106 historically operates the second vehicle 112 more frequently than the target vehicle 104. The target vehicle 104 may include various vehicle sensors 206 to detect the presence of the second vehicle 120, such as GPS sensors, radar sensors, scanning laser range finders, LIDAR devices, and image processing sensors such as cameras. The vehicle memory 204 may record the presence of the second vehicle 120 prior to turning off the target vehicle 104. The power-saving condition is based on, at least in part, whether the vehicle operator historically operates the second vehicle 120 more frequently than the target vehicle 106. Again, facial recognition by an external camera, for instance, may be used to identify an approaching vehicle operator 106.

It may be the case that the vehicle operator 106 uses the second vehicle 120 more frequently than the target vehicle 104, but the target vehicle 104 is blocking the second vehicle 120. In this case, a power-saving condition may not occur. The instructions can include instructions to determine whether the target vehicle 104 is physically blocking the second vehicle 120 and the power-saving condition is based on, at least in part, whether the target vehicle 106 is physically blocking the second vehicle 120.

In one configuration, a power-saving condition may be determined whether an electronic calendar of the vehicle operator 106 indicates the operator is not planning to drive the target vehicle 104 when the access message 110 is received by the target vehicle 104. The instructions can include instructions to associate the vehicle operator 106 with the access message 110 and to receive a calendar schedule of the vehicle operator 106. The power-saving condition may be based on, at least in part, the calendar schedule of the vehicle operator 106.

In one configuration, the power-saving condition may be based on which of several vehicles is best suited to be driven based on current driving conditions. As used herein, driving conditions means ambient conditions that affect vehicle road handling and/or visibility, such as mud, rain, ice, snow, fog, wind, etc. The instructions can include instructions to determine current driving conditions and to determine whether the target vehicle 104 is better equipped for the current driving conditions than the second vehicle 120. The power-saving condition may be based on, at least in part, whether the target vehicle 104 is better equipped for the current driving conditions than the second vehicle 120.

The vehicle operator 106 may override an initial determination of a power-saving condition by pulling on a door handle 118. The instructions in vehicle memory 204 can include instructions to receive a door handle activation signal from a door handle sensor. The power-saving condition may be based on, at least in part, whether the door handle activation signal has been received.

In one configuration, the power-saving condition may be based on whether the target vehicle 104 has been inactive for an extended period of time. The instructions can include instructions to determine whether the target vehicle 104 has been inactive for a threshold time period. As used herein, an inactive vehicle means a vehicle with the transmission shift lever placed in the "Park" position. The power-saving condition may be based on, at least in part, whether the target vehicle 104 has been inactive for a threshold time period.

It may be that power-saving condition is based on, at least in part, the ambient light conditions outside the target vehicle 104. For example, it may be the case that on a bright, sunny day activating exterior lights will not help the vehicle operator 106 identify the target vehicle 104 in an outdoor parking lot. The instructions can include instructions to determine ambient lighting conditions outside the target vehicle. The power-saving condition may be based on, at least in part, the ambient light conditions outside the target vehicle 104.

Figure 3:
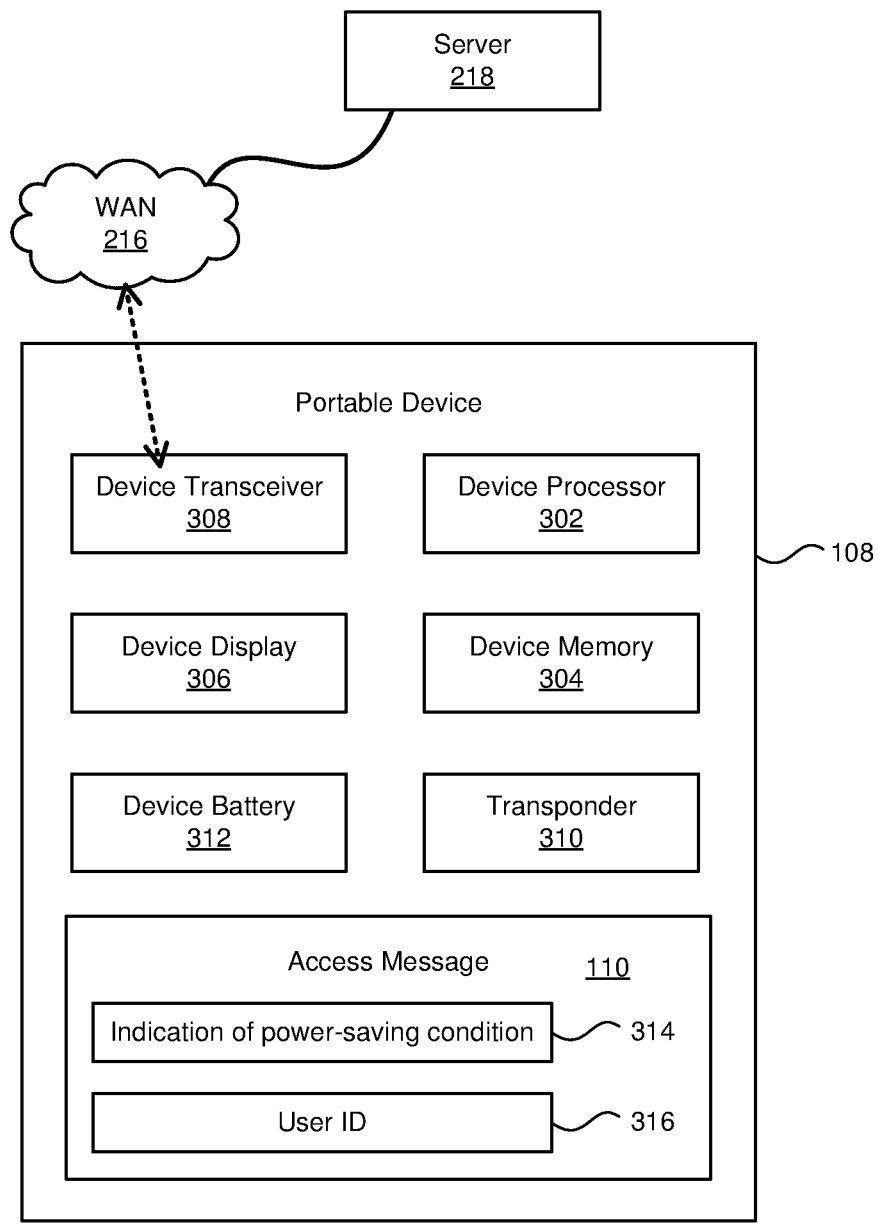
FIG. 3 shows one example configuration of a portable device disclosed herein.

FIG. 3 shows one example configuration of a portable device 108 disclosed herein. It is noted that different hardware configurations may exist for the portable device 108. The portable device 108 includes a device processor 302 and a device memory 304.

The device processor 302 may be any type of hardware or circuit capable of performing the method steps described herein, such as a general purpose processor, a digital signal processor (DSP), an application specific integrated circuit (ASIC), a field programmable gate array (FPGA) or other programmable logic device, discrete gate or transistor logic, discrete hardware components, or any combination designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The device memory 304 may be connected to the device processor 302 or embedded as part of the device processor 302. This memory may be used for storing the various information or data used in processes discussed in greater detail below. The device memory 304 can be both persistent and non-persistent. Memory can include random access memory (RAM), such as but not limited to, DRAM, SRAM, T-RAM, Z-RAM, TTRAM, etc. The memory may also include read only memory, such as but not limited to, PROM, EPROM, EEPROM, etc.

The portable device 108 may include one or more transceivers 308 for wireless communication with a mobile or wireless network, vehicles, infrastructure, or any other communication system, such as, but not limited to, Bluetooth®, radio frequency (RF), Wi-Fi, near field communication (NFC), cellular network, etc. For example, the transceiver 308 may communicate with a passive anti-theft system or a remote keyless entry transceiver at the target vehicle 104. The transceiver 308 may communicate with one or more remote sites, such as a remote server 218, via a wide area network 216. Certain transceivers may be receivers or transmitters. Additionally, transceivers and transponders may combine functionality. The device processor 302 and device memory 304 may also be reconfigured to be in series or parallel communication with the transceivers.

A transponder 310 may be used to communicate with a vehicle's passive anti-theft system or a vehicle's remote keyless entry (RKE) transceiver to allow remote keyless entry when in close proximity with a vehicle's transmitter. If the transponder 310 replies with a valid access message 110, the vehicle may allow access of the vehicle, such as, but not limited to, activating exterior lighting 112 and interior lighting (welcome lighting), lock/unlock doors, activate different ignition cycles, activate trunk release, and validate custom setting features. Additionally, the valid access message 110 may allow control of the vehicle, such as, but not limited to, allowing the engine to be started. If an invalid access message 110 is sent, the access and control of the vehicle may not be allowed. The transponder 310 may be used in conjunction with a vehicle packaged with a keyless ignition system, such as, but not limited to a push-start system, or a classic ignition switch that uses a mechanical key, or any other suitable alternative.

A vehicle communication module 214 may generate a radio signal detectable by the transponder 310 when it is in close proximity to the vehicle. The portable device 108 may also have an active transponder powered by a built-in energy source, such as a device battery 312.

The portable device 108 may or may not include a mechanical key to operate the vehicle ignition. Additionally, the portable device 108 may or may not have passive remote keyless entry. Alternative embodiments of the portable device 108 may include various combinations that may or may not include a mechanical key, passive remote keyless entry, or both. In another alternative, a transmitter or transceiver may be used in place of the transponder 310.

The portable device 108 may also contain a device display 306, an antenna, hard keys, multiple power sources, and other hardware. For example, the portable device 108 may include different location based modules, such as GPS, GLONASS, A-GPS, etc.

In one configuration, the access message 110 may include an indication of the occurrence of the power-saving condition 314. Consider, for example, a smartphone or other portable device 108 with access to the vehicle user's calendar and the capability to broadcast the access message 110. In this case, the portable device 108 may determine a calendar schedule of the vehicle operator 106. The portable device 108 may further determine the occurrence of the power-saving condition based on, at least in part, the calendar schedule of the vehicle operator 106 and, as discussed above, include indication of the occurrence of the power-saving condition 314 in the access message 110. The indication of the occurrence of the power-saving condition 314 may be encoded in the vehicle message 110 along with, for example, a public key and a user identification code 316.

Returning to FIG. 1, the vehicle memory 204 may include instructions to cause the vehicle processor 202 to, upon the authentication of the access message 110 and determining the non-occurrence of the power-saving condition, activate a greeting indicator, such as the exterior lighting 112. For example, the vehicle processor 202 may determine that, based on the vehicle user's calendar schedule, it is likely that the vehicle user 106 is going to operate the target vehicle 104 and that a power-saving condition does not exist. This may cause the vehicle processor 202 to active the vehicle's greeting indicator and indicate to the vehicle user 106 that vehicle access has been granted. As mentioned above, a greeting indicator may include, for example, exterior lighting, interior lighting, sounds, door locks, running boards, and/or suspension adjustments.

Conversely, the vehicle memory 204 may include instructions to cause the vehicle processor 202 to, upon the authentication of the access message 110 and determining the occurrence of the power-saving condition, determine not to activate the greeting indicator. For example, the processor may determine that, based on the vehicle user's calendar schedule, it is unlikely that the vehicle user 106 is going to operate the target vehicle 104 and a power-saving condition does exist. This beneficially prevents the exterior lighting 112 or other electrical circuit from activating and putting additional electrical load on the vehicle's electric battery 128. In one configuration, the target vehicle may activate the driver-side lights 114 and not the passenger-side lights 116 upon determining the occurrence of the power-saving condition.

Figure 4:
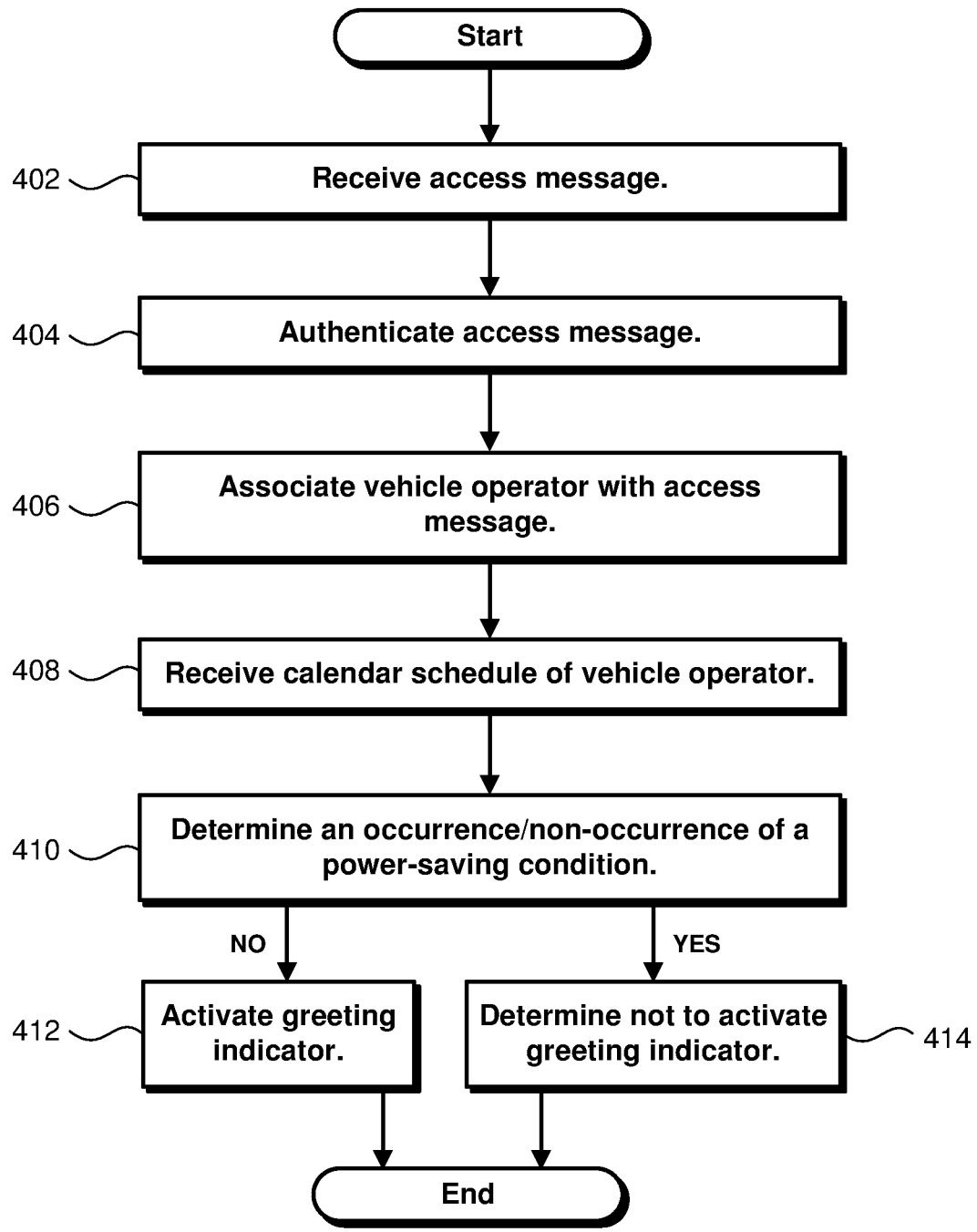
FIG. 4 shows a method for power reduction during vehicle access performed by a target vehicle.

FIG. 4 shows a method for power reduction during vehicle access performed, for example, by the target vehicle 104. As mentioned, the vehicle memory 204 may, for example, store executable instructions for performing the steps described below by the vehicle processor 202.

The method includes receiving operation 402 to receive an access message 110 by a target vehicle 104. The access message 110 may be wirelessly transmitted by a portable device 108, such as a key fob, PaaK, or another vehicle. The access message 110 may include a cryptographic code to confirm the portable device 108 is authorized to access the target vehicle 104. In some configurations, the access message 110 may include a user identification code 316 and/or an indication of the occurrence of the power-saving condition 314. After receiving operation 402, control passes to authenticating operation 404.

At authenticating operation 404, the access message 110 is authenticated. The access message may be authenticated by, for example, decrypting the cryptographic code, matching a public cryptographic key with a private cryptographic key, etc. The cryptographic code may be a fixed code or a rolling code or hopping code that changes every time an access message 110 is sent. After authenticating operation 404, control passes to associating operation 406.

At associating operation 406, a vehicle operator 106 is associated with the access message 110. This step may include parsing the user ID of the vehicle operator 106 from the access message 110. Alternatively, a lookup table or a database may be used, for example, to find an identifier of the vehicle operator 106. After associating operation 406, control passes to receiving operation 408.

At receiving operation 408, a calendar schedule of the vehicle operator 106 is received. The calendar schedule may be stored locally at the target vehicle 104. For example, the vehicle operator 106 may indicate through the vehicle's HMI 212 a morning commute Monday through Friday at 8 AM and an evening commute Monday through Friday at 5 PM. In another configuration, the vehicle operator's calendar schedule may be accessed from a server 218 or from a portable device 106. After receiving operation 408, control passes to determining operation 410.

At determining operation 410, whether a power-saving condition has occurred is determined. As discussed above, a power-saving condition is any condition where a vehicle should remain in a low-power consumption mode in response to receipt and authentication of the access message 110. When a power-saving condition exists, there is a likelihood that the vehicle operator 106 is not going to use the target vehicle 104 despite the target vehicle 104 receiving an access message.

In one configuration, determining operation 410 includes training a machine learning model to determine the occurrence of the power-saving condition or the non-occurrence of the power-saving condition. As discussed above, the vehicle processor 202 may utilize a machine learning model to automatically determine an occurrence of a power-saving condition. Furthermore, various machine learning programs, as referenced above, may be used to predict an occurrence of a power-saving condition.

The power-saving condition may be based on, at least in part, the calendar schedule of the vehicle operator 106. For example, the vehicle operator 106 may walk past the target vehicle 104 while carrying the portable device 108 on Tuesday at 7 AM. Although the target vehicle 104 receives and authenticates an access message 110 from the portable device 108, the vehicle operator's calendar schedule may indicate the vehicle operator's morning commute does not start until 8 AM. In this case, the vehicle operator 108 may merely be walking past the target vehicle 104 and is likely not planning on operating the target vehicle 104 at that moment. Thus, in this instance, the power-saving condition is determined to occur.

It may be that the power-saving condition is based on, at least in part, whether the target vehicle 104 has been inactive for a threshold time period. For example, determining operation 410 may include determining whether the target vehicle 104 has been inactive for a threshold time period. The target vehicle 104 may determine an occurrence of the power-saving condition when the vehicle has been inactive for longer than the threshold time period.

The power-saving condition may be based on, at least in part, historical usage data of the target vehicle 104 by the vehicle operator 106. For example, determining operation 410 may include determining whether a second vehicle 120 is located next to the target vehicle and determining whether the vehicle operator 106 historically operates the second vehicle 120 more frequently than the target vehicle 104. The target vehicle 104 may determine an occurrence of the power-saving condition when both the target vehicle 104 and the second vehicle are located next to one another and the vehicle operator 106 historically operates the second vehicle 120 more frequently than the target vehicle 104.

On the other hand, it may be that the target vehicle is physically blocking the second vehicle. For example, determining operation 410 may include determining whether a second vehicle 120 is located next to the target vehicle and determining the target vehicle 104 is physically blocking the second vehicle 120. In this case, the target vehicle 104 may determine a non-occurrence of the power-saving condition even when the vehicle operator 106 historically operates the second vehicle 120 more frequently than the target vehicle 104.

It may be that the power-saving condition is based on, at least in part, current driving conditions. For example, determining operation 410 may include determining whether a second vehicle 120 is located next to the target vehicle and determining whether the second vehicle 120 is better equipped for the current driving conditions than the target vehicle 104 (e.g., snow tires, all-wheel drive, fog lights, etc.). The target vehicle 104 may determine an occurrence of the power-saving condition when both the target vehicle 104 and the second vehicle are located next to one another and the second vehicle 120 is better equipped for the current driving conditions than the target vehicle 104.

Determining operation 410 may include determining ambient lighting conditions outside the target vehicle 104. If the ambient lighting conditions are such that activated exterior lights 112 would not be very visible due to the ambient light being too bright, target vehicle 104 may determine an occurrence of the power-saving condition.

In one configuration, the access message 110 includes an indication of the occurrence of the power-saving condition. For example, determining operation 410 may include parsing or extracting the indication of the occurrence of the power-saving condition from the access message 110.

The power-saving condition may be based on, at least in part, a door handle activation signal having been received. For example, determining operation 410 may include determining whether a door handle activation signal was received from a door handle sensor. If a door handle activation signal was received, this may indicate the vehicle operator 106 intends to operate the target vehicle 104 and the target vehicle 104 may determine a non-occurrence of the power-saving condition.

If, at determining operation 410, the target vehicle determines a non-occurrence of the power-saving condition, control passes to activating operation 412. During activating operation 412 the target vehicle's greeting indicator, such as the exterior lighting 112, may be activated to alert the vehicle operator 106 that access to the target vehicle 104 has been granted.

If, at determining operation 410, the target vehicle determines an occurrence of the power-saving condition, control passes to determining operation 414. At determining operation 414, the target vehicle 104 may determine not to activate the greeting inductor, such as the exterior lighting 112. By doing so, the target vehicle 104 beneficially prevents additional electrical load on the vehicle's electric battery 128 and conserves the electric charge therein. In one configuration, the target vehicle 104 may activate the driver-side lights 114 and not the passenger-side lights 116 at determining operation 414.

Figure 5:
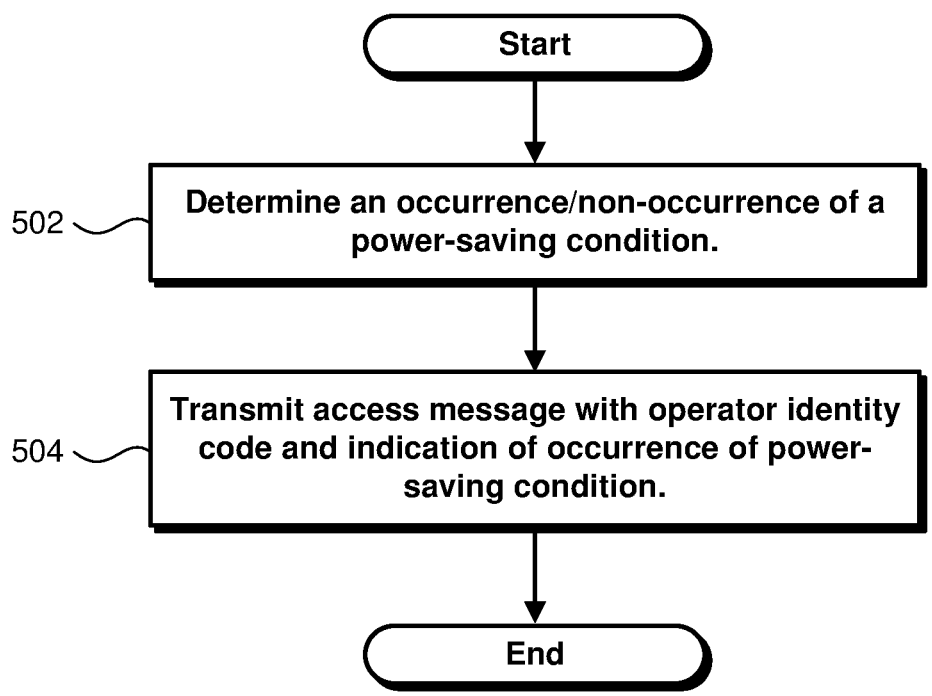
FIG. 5 shows a method for power reduction during vehicle access performed by a portable device.

FIG. 5 shows a method for power reduction during vehicle access performed, for example, by the portable device 108. As mentioned, the device memory 304 may, for example, store executable instructions for performing the steps described below by the device processor 302.

The method includes determining operation 502. During this step, the portable device 108 determines if there is an occurrence or a non-occurrence of a power-saving condition for a target vehicle 104. The determining operation 502 may include training a machine learning model to determine the occurrence of the power-saving condition or the non-occurrence of the power-saving condition.

The power-saving condition may be based on, at least in part, the calendar schedule of the vehicle operator 106. The portable device 108 may access the vehicle operators calendar schedule to determine, at determining operation 502, the likelihood the vehicle operator 108 is planning on operating the target vehicle 104.

It may be that the power-saving condition is based on, at least in part, whether the target vehicle 104 has been inactive for a threshold time period. The portable device 108 may determine, at determining operation 502, an occurrence of the power-saving condition when the target vehicle 104 has been inactive for longer than the threshold time period.

The power-saving condition may be based on, at least in part, historical usage data of the target vehicle 104 by the vehicle operator 106. The portable device 108 may determine, at determining operation 502, an occurrence of the power-saving condition when both the target vehicle 104 and the second vehicle are located next to one another and the vehicle operator 106 historically operates the second vehicle 120 more frequently than the target vehicle 104. On the other hand, the portable device 108 may determine, at determining operation 502, a non-occurrence of the power-saving condition even when the vehicle operator 106 historically operates the second vehicle 120 more frequently than the target vehicle 104 if the target vehicle 104 is physically blocking the second vehicle 120.

It may be that the power-saving condition is based on, at least in part, current driving conditions. The portable device 108 may determine, at determining operation 502, an occurrence of the power-saving condition when both the target vehicle 104 and the second vehicle are located next to one another and the second vehicle 120 is better equipped for the current driving conditions than the target vehicle 104.

It may be that the power-saving condition is based on, at least in part, ambient light conditions outside the target vehicle. The portable device 108 may determine, at determining operation 502, an occurrence of the power-saving condition when the ambient lighting conditions are such that activated exterior lights would not be very visible.

Upon determining an occurrence or non-occurrence of the power-saving condition, control passes to transmitting operation 504. During this step, the portable device 108 transmits an access message 110. The access message may include an operator identity code 316 and an indication of the occurrence of the power-saving condition 314. As discussed above, the power-saving condition in the access message 110 may be used by the target vehicle 104 to, for example, active exterior lights 112 or maintain the target vehicle is a standby power state.

The descriptions of the various examples and implementations have been presented for purposes of illustration but are not intended to be exhaustive or limited to the implementations disclosed. Many modifications and variations will be apparent to those of ordinary skill in the art without departing from the scope and spirit of the described implementations. The terminology used herein was chosen to best explain the principles of the implementations, the practical application or technical enhancements over technologies found in the marketplace, or to enable others of ordinary skill in the art to understand the implementations disclosed herein.

As will be appreciated, the methods and systems described may be implemented as a computer program product. The computer program product may include a computer readable storage medium (or media) having computer readable program instructions thereon for causing a processor to carry out operations discussed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some implementations, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry.

Various implementations are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising:
a processor and a memory, the memory storing instructions executable by the processor, including instructions to:
   receive an access message by a target vehicle, the target vehicle including at least one greeting indicator;
   authenticate the access message;
   determine one of an occurrence of a power-saving condition and a non-occurrence of the power-saving condition;
   upon authentication of the access message and determining the non-occurrence of the power-saving condition, activate the greeting indicator; and
   upon authentication of the access message and determining the occurrence of the power-saving condition, determine not to activate the greeting indicator.

2. The system of claim 1, further comprising:
wherein the instructions include instructions to:
   associate a vehicle operator with the access message;
   receive a calendar schedule of the vehicle operator; and
wherein the power-saving condition is based on, at least in part, the calendar schedule of the vehicle operator.

3. The system of claim 1, further comprising:
wherein the instructions include instructions to associate a vehicle operator with the access message; and
wherein the power-saving condition is based on, at least in part, historical usage data of the target vehicle by the vehicle operator.

4. The system of claim 3, further comprising:
wherein the instructions include instructions to:
   determine whether a second vehicle is located next to the target vehicle;
   determine whether the vehicle operator historically operates the second vehicle more frequently than the target vehicle; and
wherein the power-saving condition is based on, at least in part, whether the vehicle operator historically operates the second vehicle more frequently than the target vehicle.

5. The system of claim 4, further comprising:
wherein the instructions include instructions to determine whether the target vehicle is physically blocking the second vehicle; and
wherein the power-saving condition is based on, at least in part, whether the target vehicle is physically blocking the second vehicle.

6. The system of claim 4, further comprising:
wherein the instructions include instructions to:
   determine current driving conditions;
   determine whether the target vehicle is better equipped for the current driving conditions than the second vehicle; and wherein the power-saving condition is based on, at least in part, whether the target vehicle is better equipped for the current driving conditions than the second vehicle.

7. The system of claim 1, further comprising:
wherein the instructions include instructions to receive a door handle activation signal from a door handle sensor; and
wherein the power-saving condition is based on, at least in part, whether the door handle activation signal has been received.

8. The system of claim 1, further comprising:
wherein the instructions include instructions to determine whether the target vehicle has been inactive for a threshold time period; and
wherein the power-saving condition is based on, at least in part, whether the target vehicle has been inactive for a threshold time period.

9. The system of claim 1, further comprising:
wherein the instructions include instructions to determine ambient lighting conditions outside the target vehicle; and
wherein the power-saving condition is based on, at least in part, the ambient light conditions outside the target vehicle.

10. The system of claim 1, wherein the access message includes an indication of the occurrence of the power-saving condition.

11. The system of claim 1, wherein the instructions include instructions to determine one of the occurrence of the power-saving condition and the non-occurrence of the power-saving condition according to a trained machine learning model.

12. A system comprising:
a portable device including a processor and a memory, the memory storing instructions executable by the processor, including instructions to:
determine one of an occurrence and a non-occurrence of a power-saving condition for a target vehicle, wherein the power-saving condition includes that the target vehicle is in a standby mode; and
transmit, by the portable device, an access message, the access message including an indication of the occurrence of the power-saving condition.

13. The system of claim 12, further comprising:
wherein the instructions include instructions to:
determine a vehicle operator of the target vehicle;
determine a calendar schedule of the vehicle operator; and
wherein the power-saving condition is based on, at least in part, a calendar schedule of the vehicle operator.

14. The system of claim 12, further comprising:
wherein the instructions include instructions to associate a vehicle operator to the access message; and
wherein the power-saving condition is based on, at least in part, historical usage data of the target vehicle by the vehicle operator.

15. The system of claim 12, further comprising:
wherein the instructions include instructions to:
determine whether a second vehicle is located next to the target vehicle;
determine whether the vehicle operator historically operates the second vehicle more frequently than the target vehicle; and
wherein the power-saving condition is based on, at least in part, whether the vehicle operator historically operates the second vehicle more frequently than the target vehicle.

16. The system of claim 15, further comprising:
wherein the instructions include instructions to determine whether the target vehicle is physically blocking the second vehicle; and
wherein the power-saving condition is based on, at least in part, whether the target vehicle is physically blocking the second vehicle.

17. The system of claim 15, further comprising:
wherein the instructions include instructions to:
determine current driving conditions;
determine whether the target vehicle is better equipped for the current driving conditions than the second vehicle; and
wherein the power-saving condition is based on, at least in part, whether the target vehicle is better equipped for the current driving conditions than the second vehicle.

18. The system of claim 12, further comprising:
wherein the instructions include instructions to determine whether the target vehicle has been inactive for a threshold time period; and
wherein the power-saving condition is based on, at least in part, whether the target vehicle has been inactive for a threshold time period.

19. A method comprising:
receiving an access message by a target vehicle, the target vehicle including exterior lighting;
authenticating the access message;
determining one of an occurrence of a power-saving condition and a non-occurrence of the power-saving condition;
activating the exterior lighting upon authentication of the access message and determining the non-occurrence of the power-saving condition; and
determining not to activate the exterior lighting upon authentication of the access message and determining the occurrence of the power-saving condition.

20. A computer programmed to carry out the method of claim 19.

* * * * *